(12) United States Patent
Braun et al.

(10) Patent No.: US 7,518,271 B2
(45) Date of Patent: Apr. 14, 2009

(54) ELECTRIC MACHINE WITH STATOR COOLING TEETH

(75) Inventors: Horst Braun, Stuttgart (DE); Thomas Berger, Ditzingen (DE); Eugen Hellekes, Stuttgart (DE); Robert Goldschmidt, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 10/557,091

(22) PCT Filed: Oct. 7, 2004

(86) PCT No.: PCT/DE2004/002223

§ 371 (c)(1),
(2), (4) Date: Nov. 17, 2005

(87) PCT Pub. No.: WO2005/064772

PCT Pub. Date: Jul. 14, 2005

(65) Prior Publication Data

US 2007/0063593 A1    Mar. 22, 2007

(30) Foreign Application Priority Data

Dec. 30, 2003    (DE) ............................... 103 61 864

(51) Int. Cl.
  H02K 5/18    (2006.01)
  H02K 9/06    (2006.01)
(52) U.S. Cl. ..................... 310/62; 310/89; 310/216; 310/58
(58) Field of Classification Search .............. 310/52, 310/58, 59, 60 R, 62, 63, 89, 216
See application file for complete search history.

(56) References Cited

U.S. PATENT DOCUMENTS

| 2,845,551 | A | 7/1958 | Potter |
| 3,663,848 | A | 5/1972 | Lehoczky |
| 2003/0094865 | A1 | 5/2003 | Sugitani |
| 2003/0184244 | A1 | 10/2003 | Stevens et al. |
| 2007/0063593 | A1* | 3/2007 | Braun et al. ............ 310/58 |

FOREIGN PATENT DOCUMENTS

| DE | 41 03 154 A1 | 8/1992 |
| DE | 44 25 000 | 1/1996 |
| EP | 1 209 796 A3 | 2/2004 |
| FR | 2 756 116 | 5/1998 |
| GB | 688 740 | 3/1953 |
| JP | 55-56446 | 4/1980 |
| JP | 3-101380 | 4/1991 |
| JP | 04265643 A | 9/1992 |
| JP | 07177689 A * | 7/1995 |
| JP | 8/47186 | 2/1996 |

* cited by examiner

*Primary Examiner*—Karl Tamai
*Assistant Examiner*—David W. Scheuermann
(74) *Attorney, Agent, or Firm*—Michael J. Striker

(57) ABSTRACT

An electrical machine, in particular a rotary current generator for motor vehicles, is proposed which has a housing (13) in which a stator (16) is retained, such that a coolant can flow around the outside of the stator (16) from one of its axial face ends (57) to a circumferential region of the stator (16), defining a flow cross section of the flow course through the stator (16) and the housing (13). The flow course is defined toward the stator by outer stator teeth (62) located on the outer circumference of the stator (16).

10 Claims, 4 Drawing Sheets

ELECTRIC MACHINE WITH STATOR COOLING TEETH

CROSS-REFERENCE TO RELATED APPLICATION

The invention described and claimed hereinbelow is also described in German Patent Application DE 103 61 864.3 filed on Dec. 30, 2003. This German Patent Application provides the basis for a claim of priority of invention under 35 U.S.C. 119(a)-(d).

BACKGROUND OF THE INVENTION

From Published German Patent Disclosure DE 44 25 000 A1, an electrical machine embodied as a rotary current generator for motor vehicles is known. This reference describes, among other things, the fact that an air gap may be provided, which is located between a circumferential region of a housing part and the lamination packet of the stator.

The electrical machine of the invention having the characteristics of the main claim, in which among other features it is provided that the flow course is defined toward the stator by outer stator teeth located on the outer circumference of the stator, has the advantage that the cooling area of the stator is markedly increased as a result, and thus the stator can be cooled better on its outer surface.

It is especially advantageous if outer teeth, extending outward and axially, which define the outer stator slots in the circumferential direction extend from the yoke. This has the advantage that the yoke is not weakened, but instead its surface area is increased by additional material extending out from the yoke. This improves both the magnetic flux in the stator iron on the one hand and the convention on the other.

In a further feature of the invention, the stator is retained in the housing via its outer teeth, and the housing rests on an axial face end of the outer stator teeth, and the outer stator teeth are received in a fitted fashion by a housing opening. By this provision, the heat transfer from the stator iron via its outer stator teeth to the housing is improved, since the outer stator teeth rest at least partly in the housing opening on the housing.

A further improvement in the invention is obtained by providing that a housing part, for instance a bearing plate, adjacent to the stator has a toothed or slotted end face, and housing slots are diametrically opposite the outer stator slots. By this provision, an improved guidance of the flow in the circumferential region, that is, at the interface between stator and bearing plate, is made possible, since because of the toothed or slotted end face, additional conduits or flow possibilities are opened up, and thus the flow resistance in this region drops further. The volumetric flow for the coolant can thus be further increased, and as a result the temperature of the stator drops.

For adjusting the desired quantity of cooling air in the region of the contact face between the stator and the housing part, it is provided that the housing slots extend in an annular region of the housing part and also end in that region. In addition, via the design, for instance with regard to the length of these housing slots, the stability of the annular region is also influenced in terms of its vibration properties and thus its vulnerability to breakage. If the housing slots did not end in the annular region, the housing part would be weakened too greatly. It is provided that the housing slots end with a chamfer. This has the advantage that the effective flow cross section is especially large at the transition from the region outside the winding heads of the stator iron or stator to the housing part.

As a result, the flow can be guided better. Moreover, the risk that these openings will become soiled and thus plugged up is lessened.

In a further feature of the invention, it is provided that the housing slots alternate with housing teeth, and an inside diameter of the housing teeth is greater than an inside diameter of the outer stator slots. This has the advantage that directly in the plane in which the stator rests on the housing part, the blocking of the flow course by the housing teeth is especially slight. As a result, the flow resistance in this flow path is reduced, and thus the coolant throughput is also improved, leading to the known consequences of such an improvement.

For improved flow guidance, it is provided that the continuous annular region extends for at least 20% up to approximately 70% of its total axial length over the stator. Thus the continuous annular region covers a certain length of the stator, or of its outer stator teeth. As a result, the cooling air can flow over the surface of the outer stator teeth longer, and the cooling effect for the stator or stator iron is thus improved.

The vibration properties of the housing part are furthermore improved by this coverage of the stator.

For further improvement, it is provided that the housing teeth are wider in the circumferential direction than the outer stator teeth.

To further optimize the heat transfer or flow properties, it is provided that the outer stator teeth are covered by housing teeth in a first approximation over a radial length of 40% to 70%. In a second approximation, it is provided that this coverage amounts to between 50% to 64%.

BRIEF DESCRIPTION OF THE DRAWINGS

In the drawings, exemplary embodiments are shown of an electrical machine of the invention. Shown are FIG. 1, a cross section through an electrical machine embodied as a rotary current generator.

DESCRIPTION OF THE PREFERRED EMBODIMENTS

Figure 1:
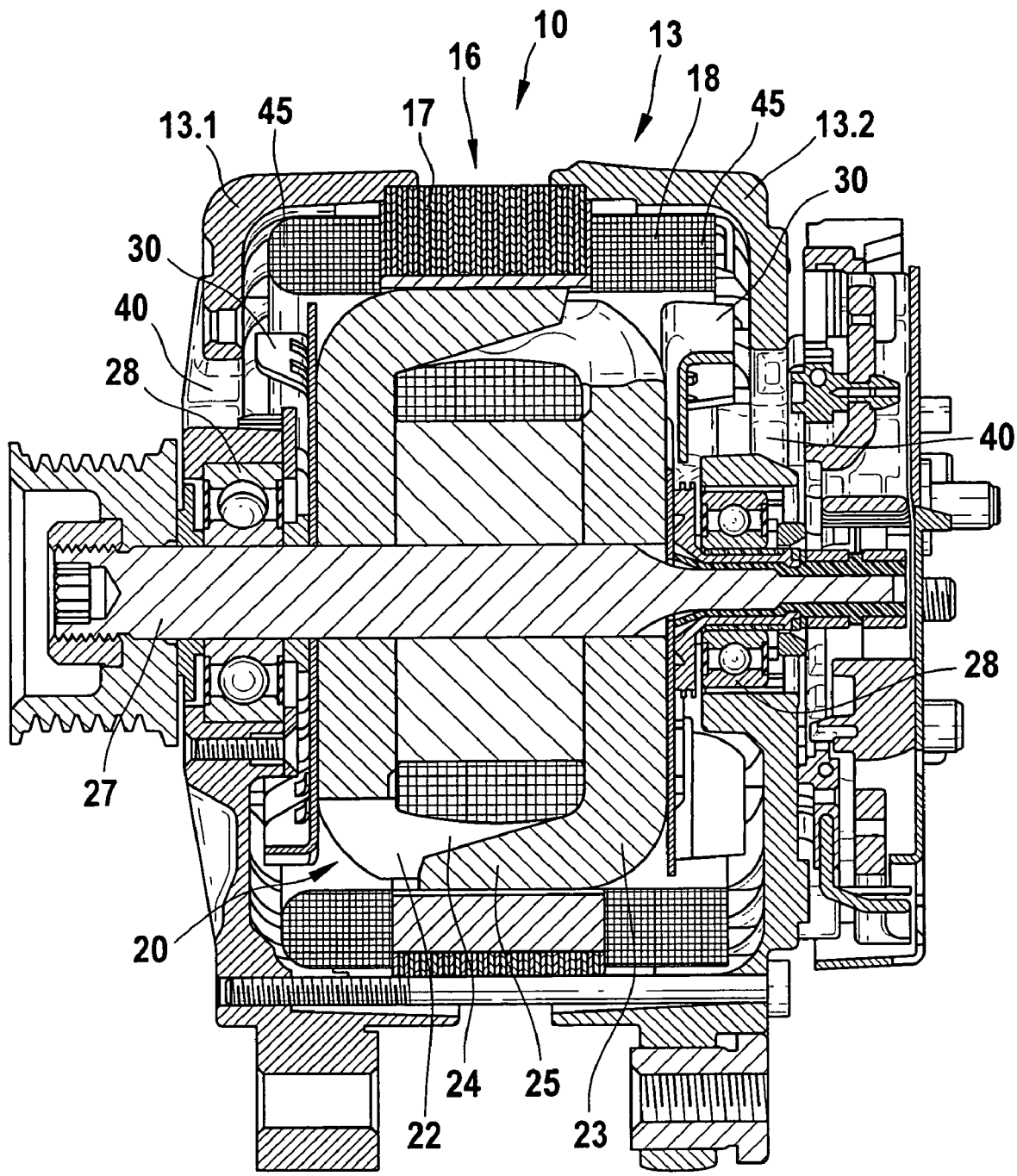

In FIG. 1, a cross section is shown through an electrical machine 10, in this case embodied as a generator or rotary current generator for motor vehicles. This electrical machine 10 has, among other elements, a two-part housing 13, which comprises a first bearing plate 13.1 and a second bearing plate 13.2. The bearing plate 13.1 and the bearing plate 13.2 within themselves receive a so-called stator 16, which on the one hand comprises a substantially circular-annular stator iron 17, and in whose radially inward-oriented, axially extending slots a stator winding 18 is placed. This annular stator 16, with its radially inward-oriented, slotted surface, surrounds a rotor 20, which is embodied as a claw-pole rotor. The rotor 20 comprises, among other elements, two claw-pole plates 22 and 23, on the outer circumference of each of which an axially extending claw-pole prong 24 and 25, respectively, is located. Both claw-pole plates 22 and 23 are located in the rotor 20 such that their respective axially extending claw-pole prongs 24 and 25 alternate with one another on the circumference of the rotor 20. This creates magnetically required interstices, called claw-pole interstices, between the oppositely magnetized claw-pole prongs 24 and 25. The rotor 20 is rotatably supported in the respective bearing plates 13.1 and 13.2 by means of a shaft 27 and one roller bearing 28 each located in a respective side of the rotor.

The rotor 20 has a total of two axial face ends, on each of which one fan 30 is secured. This fan 30 substantially comprises a platelike or disklike portion, from which fan blades extend in a known way. These fans 30 serve to enable an exchange of air, via openings 40 in the bearing plates 13.1 and 13.2, between the outside of the electrical machine 10 and the interior of the electrical machine 10. To that end, the openings 40 are provided essentially on the axial ends of the bearing plates 13.1 and 13.2, by way of which cooling air is aspirated into th interior of the electrical machine 10 by means of the fans 30. This cooling air is accelerated radially outward by the rotation of the fans 30, so that this air can pass through the cooling-air-permeable winding overhang 45. The winding overhang 45 is cooled as a result of this effect. After passing through the winding overhang 45, or after flowing around the outside of this winding overhang 45, the cooling air takes a radially outward course, through openings not shown here in FIG. 1. The cooling air also takes a course in the joint between the bearing plate 13.1 and the stator iron 17, and in the joint between the stator 17 and the bearing plate 13.2. The more-detailed design of the joints between the stator iron 17 and the bearing plate 13.1 and bearing plate 13.2, respectively, will be addressed in conjunction with the following drawing figures.

Figure 2:
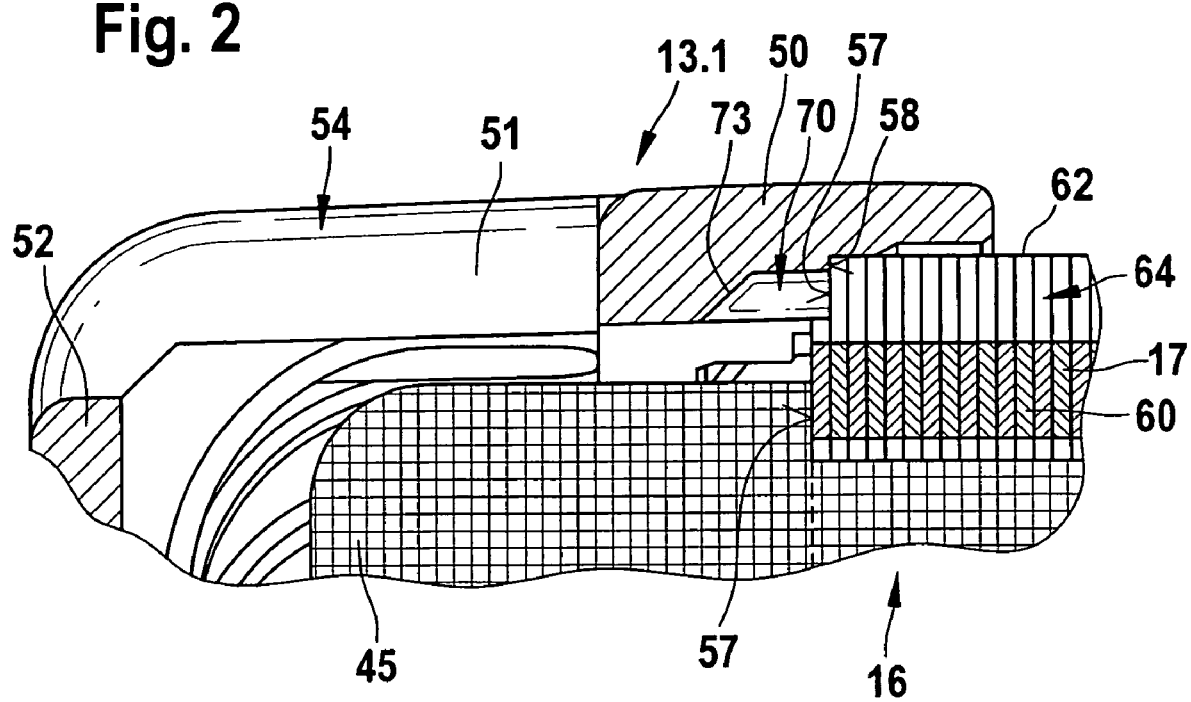
FIG. 2, in a first exemplary embodiment, a fragmentary cross section at a transition point between the stator iron and the housing.

FIG. 2 shows the transition from the housing 13, or housing part 13.1, to the stator 16, or stator iron 17. The housing 13 or housing part 13.1 has an annular region 50, which is joined via ribs 51 in the axial or radial direction to a platelike portion 52 of the housing part. The housing part 13.1 thus has a substantially cuplike shape. In the region of the ribs 51, because of their distribution on the outer circumference of the housing part 13.1, openings 54 are created between each two ribs 51 and serve to allow the cooling air, which is passed through the winding overhang 45, to reach the outside.

The annular region 50 serves to receive the stator 16. The stator is retained in the housing or the housing part 13.1 in such a way that the stator 16 rests with one of its axial face ends 57 on an axial contact face in the housing part 13.1 or annular region 50. One outer stator slot 64 each also extends axially between two adjacent outer stator teeth 62. The stator 16 thus rests with one axial face end, or with the individual axial face ends 57, of its outer teeth 62 on an axial face end 58 of the annular region 50.

The inside diameter of the annular region 50 is selected such that after assembly, or the fitting in of the stator 16 into the housing part 13.1, openings remain free between these two components in the joint, which enable a flow from the region of the winding head 45 to the outer circumference of the stator 16 in the joint between the annular region 50 and the stator 16. Toward the stator, the flow course is defined by the outer stator slots 64 located on the outer circumference of the stator 16.

In summary, it can thus be stated that an electrical machine is provided, having a stator 16 retained in a housing 13, the stator 16 being retained in the housing 13 such that there can be a coolant flow around the outside of the stator 16 from one of its axial face ends 57 to a circumferential region of the stator 16. The flow cross section of the flow course through the stator 16 and the housing 13 is defined, and the stator 16 is designed especially in that the flow course is defined toward the stator by outer stator teeth 62 located on the outer circumference of the stator 16.

Figure 2A:
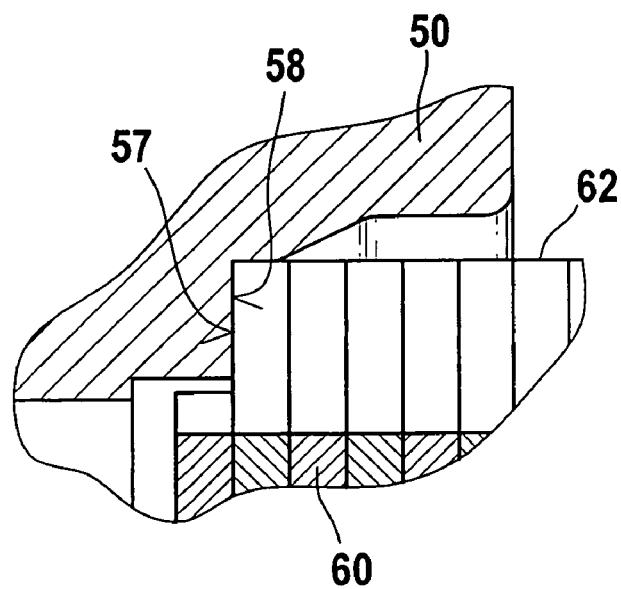
FIG. 2a, in a second exemplary embodiment, a fragmentary cross section at a transition point between the stator iron and the housing.
Figure 3:
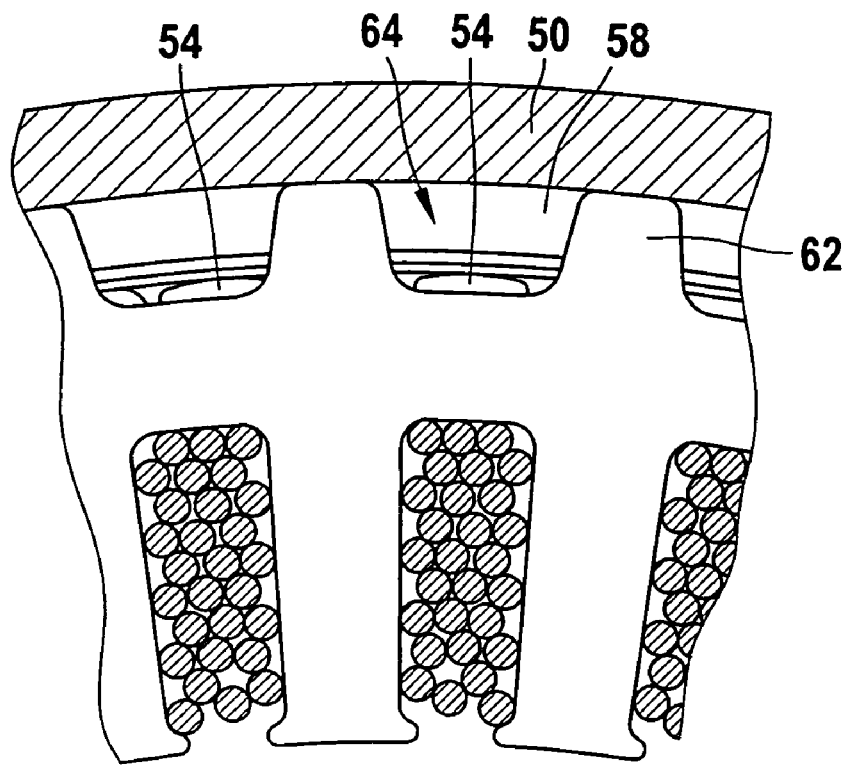
FIG. 3, a fragmentary view of a stator iron.

This relationship applies as well to an easily modified construction; see FIG. 2a also. In contrast to the version of FIG. 2, however, the flow passage here is made more difficult, since the annular region 50 of the housing part 13.1 shown here has no special characteristics for improving this situation; see also FIG. 3.

In both exemplary embodiments, the outer stator teeth 62 are received by a housing opening in a fitted fashion. For improving or in another words enlarging the flow passage or the flow opening directly in the joint between the housing part 13.1 and the stator 16, it is provided that a housing part adjacent to the stator 16, in this case the housing part 13.1, has a toothed or slotted end face 58, and housing slots are located axially diametrically opposite the outer stator slots 54.

Figure 4:
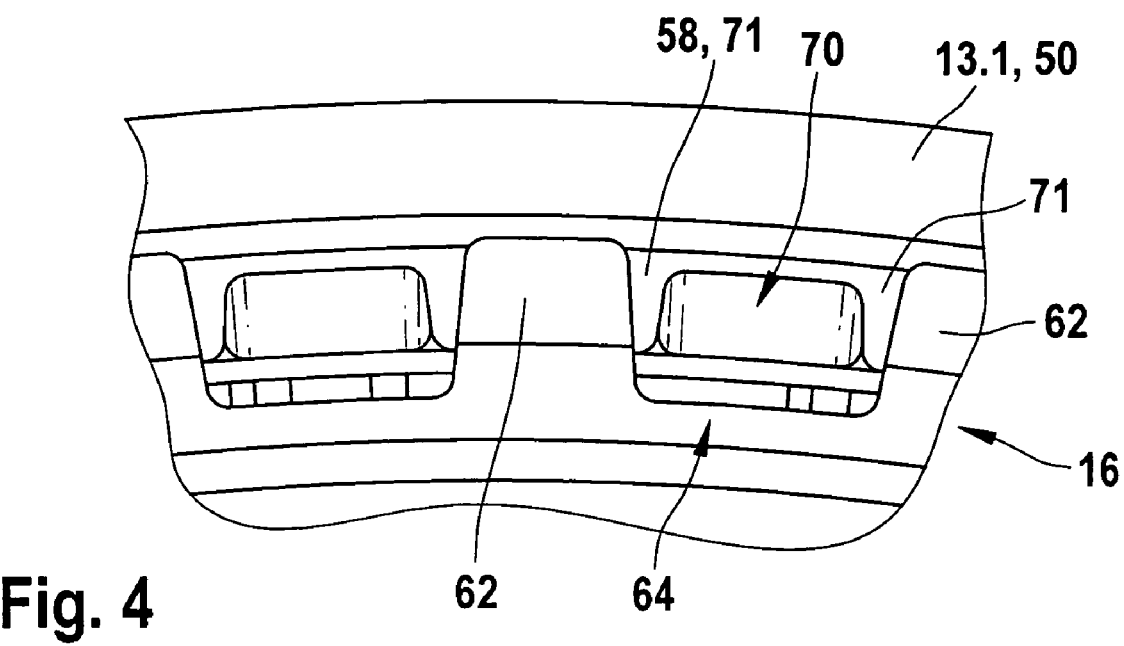
FIG. 4, a fragmentary view in the axial direction of the stator iron in the direction toward a housing part.

FIG. 4 in fragmentary form shows an axial view of the joint between the housing part 13.1 and the stator 16. The outer stator teeth 62 and the outer stator slots 64 located between them can be seen clearly. Depending on the outer contour of the stator 16, the annular region 50 is toothed or slotted at the point that receives the stator 16. This means that the region located axially opposite the stator 16, or in other words the axial face end 58, has housing slots 70 and housing teeth 71. Thus the annular region 50 of the housing part 13.1 is toothed or slotted over its inner circumference on the side facing toward the stator 16 and thus in this region is externally similar to a so-called hollow gear wheel. As FIG. 4 clearly shows, it is provided that the housing slots 70 are located opposite the outer stator slots 64, or in other words, that the housing teeth 71 are opposite the outer stator teeth 62.

Figure 5:
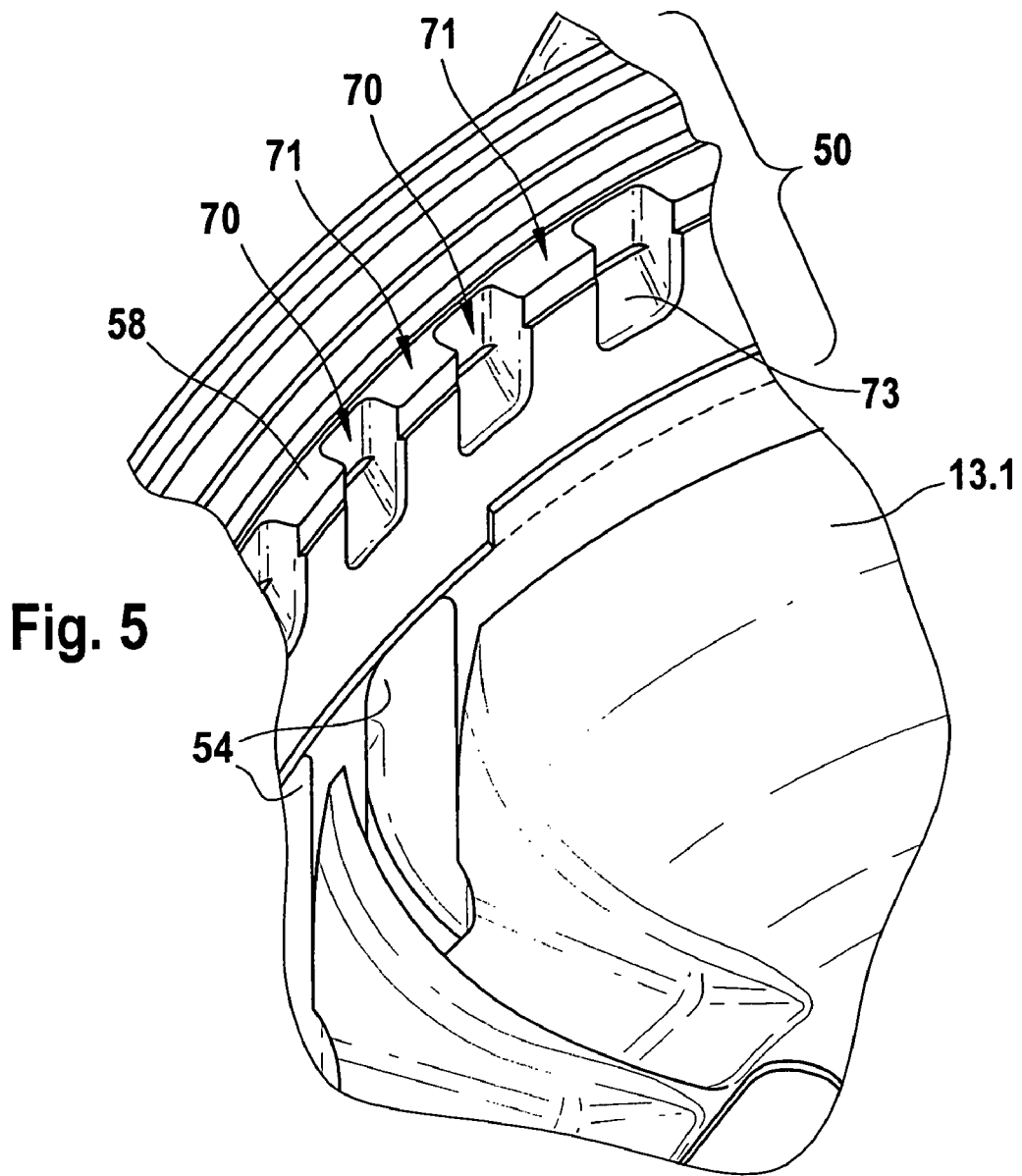
FIG. 5, a three-dimensional view on an inside of a housing part.

FIG. 5 is a fragmentary three-dimensional view of the interior of the housing part 13.1. The annular region 50 is shown in rough form and extends from the region that is intended for receiving the stator 16 to the region where the openings 54 being. In this view, the alternating housing slots 70 and housing teeth 71 can be seen clearly. The housing slots 70 are already visible in FIG. 2. There the chamfer 73 with which the housing slots 70 end is also already shown. The housing slots 70 extend in the annular region 50 of the housing part 13.1 and also end in this annular region 50.

Figure 6:
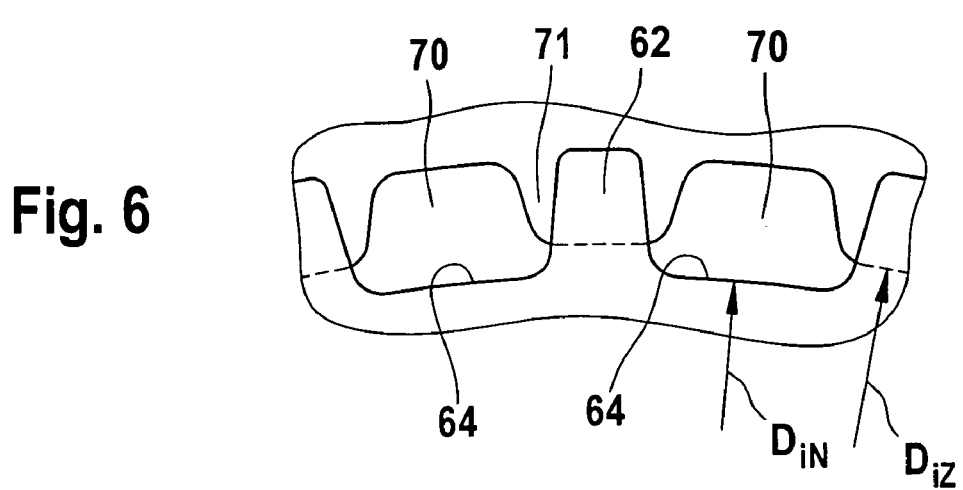
FIG. 6, a fragmentary view illustrating certain dimensional ratios at the transition from the stator iron to the housing part.

FIG. 6, in a simplified illustration, shows the diametrically opposed housing teeth 71 and outer stator teeth 62, in the plane of the axial face end 58 and 57, respectively. An inside diameter $D_{iN}$ of the outer stator slots 64 is defined as the diameter of the base of the outer stator slots 64. The inside diameter $D_{iZ}$ of the housing teeth 71 is the smallest diameter described by the housing teeth 71. It is provided here that on the one hand the housing slots 70 alternate with housing teeth 71, and an inside diameter $D_{iZ}$ of the housing teeth 71 is greater than an inside diameter $D_{iN}$ of the outer stator slots 64.

As FIG. 6 also shows, the housing teeth 71 should be wider in the circumferential direction than the outer stator teeth 62.

It is also provided that the outer stator teeth 62 are covered in a first approximation over a radial length of 40% to 70% by housing teeth 71 or the axial face end 58. In a second approximation, it is provided that the coverage is between 50% and 64%.

For the annular region, it is provided that it extends for at least one-third to approximately one-half of its total axial length the stator iron 17.

The invention claimed is:

1. An electrical machine, comprising a stator (16) retained in a housing (13), the stator (16) being retained in the housing (13) such that a coolant can flow around the outside of the stator (16) from one of its axial face ends (57) to a circumferential region of the stator (16), defining a flow cross section of the flow course through the stator (16) and the housing (13), wherein the flow course is defined toward the stator by outer stator teeth (62) located on the outer circumference of the stator (16), wherein the stator (16) is retained in the housing (13) via its outer stator teeth (62), and the housing (13) rests on an axial face end (57) of the outer stator teeth (62), while the outer stator teeth (62) are received in a fitted fashion by a housing opening, wherein the housing (13) has radially inwardly extending housing teeth (71) resting on the axial end face (57) of the outer stator teeth (62) and wherein the coolant discharges outwardly on the outer circumference of the stator (16).

2. An electrical machine according to claim 1, wherein outward-extending outer stator teeth (62), which define the outer stator slots (64) in the circumferential direction, extend from a yoke (60).

3. An electrical machine according to claim 1, wherein a housing part (13.1, 13.2) adjacent to the stator (16) has a toothed or slotted end face (58), and housing slots (70) are diametrically opposite the outer stator slots (64).

4. An electrical machine according to claim 3, wherein the housing slots (70) extend in an annular region (50) of the housing part (13.1, 13.2) and end in that region.

5. An electrical machine according to claim 4, wherein the housing slots (70) end with a chamfer (73).

6. An electrical machine comprising a stator (16) retained in a housing (13), the stator (16) being retained in the housing (13) such that a coolant can flow around the outside of the stator (16) from one of its axial face ends (57) to a circumferential region of the stator (16), defining a flow cross section of the flow course through the stator (16) and the housing (13), wherein the flow course is defined toward the stator by outer stator teeth (62) located on the outer circumference of the stator (16), wherein the housing slots (70) alternate with housing teeth (71), and an inside diameter ($D_{IZ}$) of the housing teeth (71) is greater than an inside diameter ($D_{IN}$) of the outer stator slots (64).

7. An electrical machine according to claim 4, wherein the continuous annular region (50) extends for at least 20% up to approximately 70% of its total axial length over a stator iron (17).

8. An electrical machine according to claim 3, wherein the housing teeth (71) are wider in the circumferential direction than the outer stator teeth (62).

9. An electrical machine according to claim 3, wherein the outer stator teeth are covered, in the first approximation over a radial length of 40% to 70% and in a second approximation from 50% to 64%, by housing teeth or the axial face end (58).

10. An electrical machine as defined in claim 1, wherein the electrical machine is a rotary current generator for motor vehicles.

* * * * *